United States Patent [19]

Nomura

[11] Patent Number: 5,651,630
[45] Date of Patent: Jul. 29, 1997

[54] CONNECTING DEVICES FOR FRAME BARS WITH POLYGONAL CROSS-SECTIONAL SHAPE

[76] Inventor: Ryoichi Nomura, c/o NIC Autotec Company, Limited 255 Nagaresugi, Toyama 939, Japan

[21] Appl. No.: 536,240

[22] Filed: Sep. 29, 1995

[30] Foreign Application Priority Data

Dec. 7, 1994 [JP] Japan .................................. 6-330647

[51] Int. Cl.⁶ ........................................... F16B 1/02
[52] U.S. Cl. ........................... 403/219; 403/170; 403/175; 403/178
[58] Field of Search ........................ 403/170, 169, 403/174, 175, 178, 217, 219; 52/648.1, 653.1, 665, 655.1

[56] References Cited

U.S. PATENT DOCUMENTS

| | | | |
|---|---|---|---|
| 2,863,682 | 12/1958 | Canepa | 403/175 |
| 3,901,613 | 8/1975 | Andersson | 403/178 X |
| 4,371,281 | 2/1983 | Magner | 403/219 |
| 4,583,359 | 4/1986 | Staeger | 52/655.1 X |
| 5,169,258 | 12/1992 | Raynak | 403/178 X |
| 5,265,972 | 11/1993 | Bahr | 52/655.1 X |
| 5,413,836 | 5/1995 | Hsieh | 52/655.1 X |

FOREIGN PATENT DOCUMENTS 1514258  1/1968  France .................................. 403/175

*Primary Examiner*—Anthony Knight

[57] ABSTRACT

A device for connecting together elongated construction materials has one or more end-surface connecting parts each for being connected to an end surface of one of the materials and a side-surface connecting part for receiving and being connected to side surfaces of another one of the materials. Each end-surface connecting part has a bolt-accepting hole formed for allowing a bolt to pass through and a counter-bored part formed on the reverse side for receiving therein the head the bolt. The side-surface connecting part has an indentation for accepting therein and being connected transversely to another of elongated construction materials. Bolts are passed through holes in the side-surface connecting part to securely attach it to side surfaces of this another elongated construction material.

6 Claims, 21 Drawing Sheets

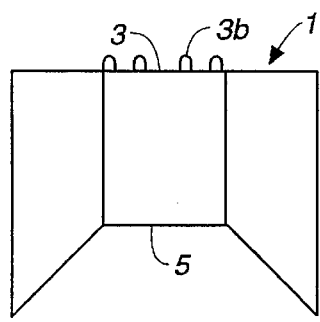
FIG._1A
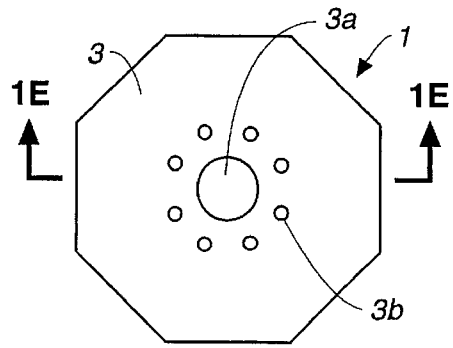
FIG._1B
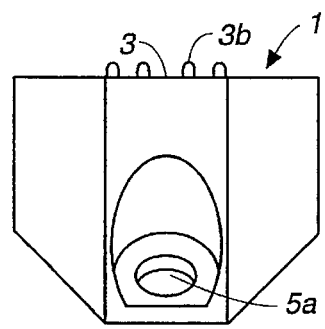
FIG._1D
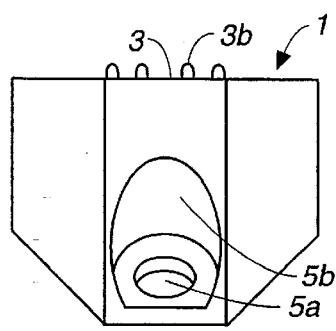
FIG._1E
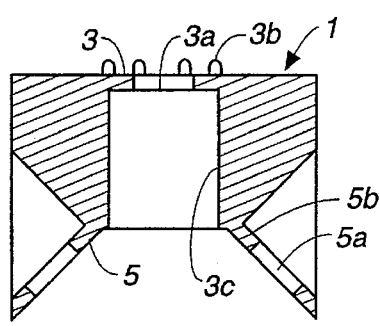
FIG._1F
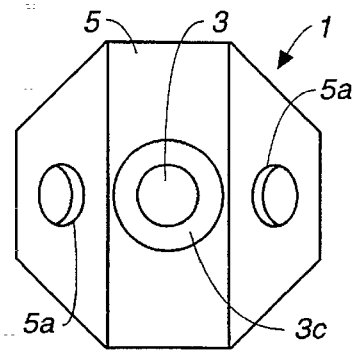
FIG._1G
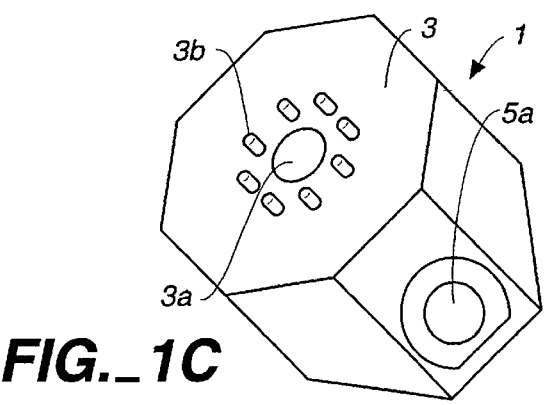
FIG._1C

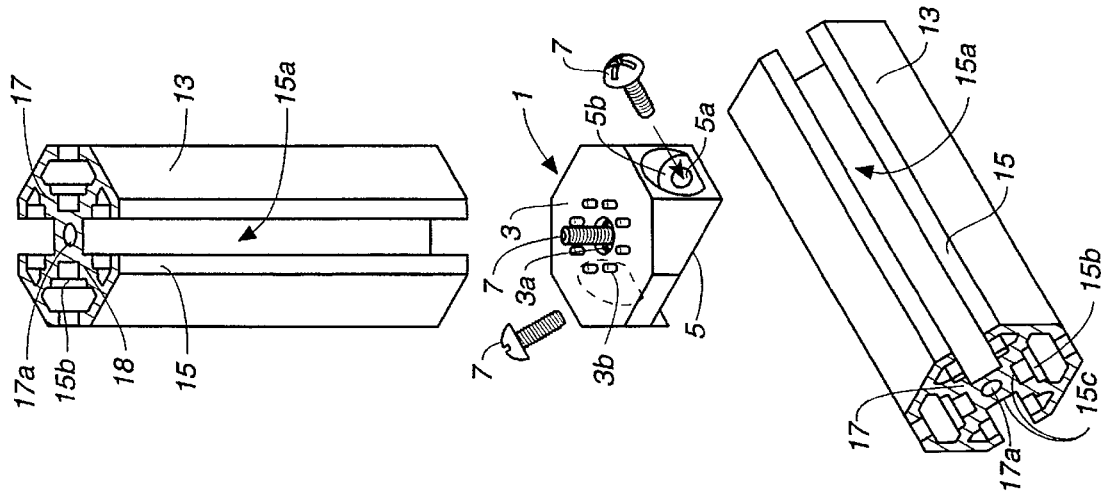
FIG._2A
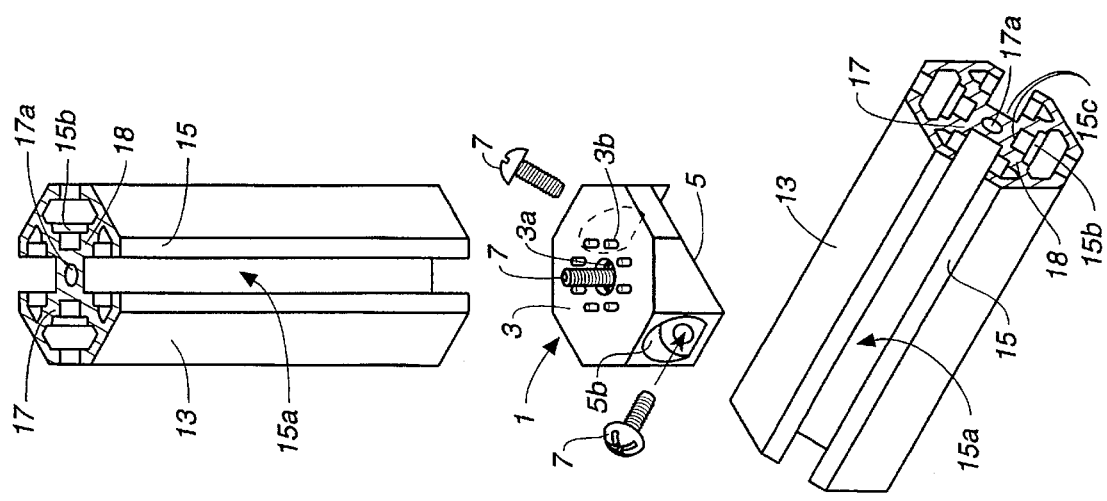
FIG._2B

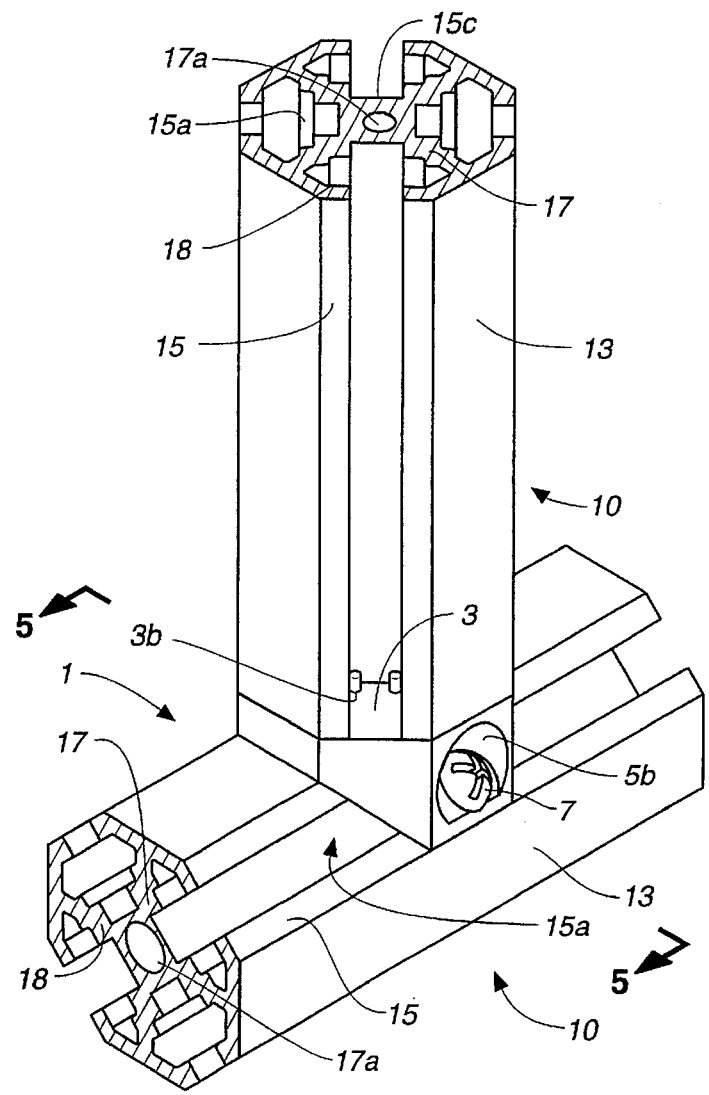
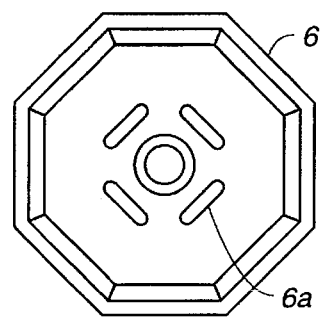
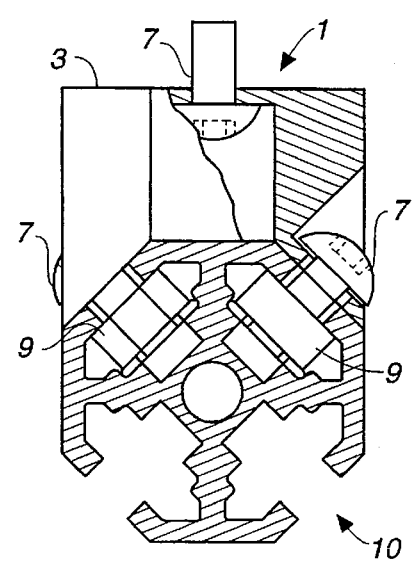
FIG._3
FIG._4
FIG._5

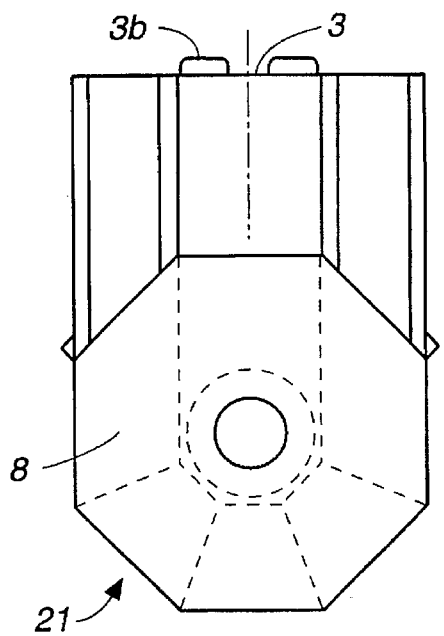
FIG._6A
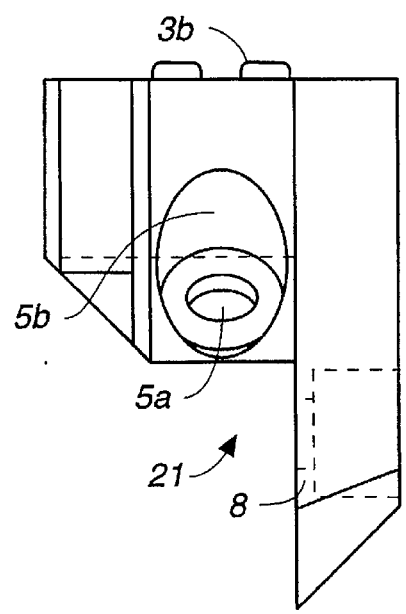
FIG._6D
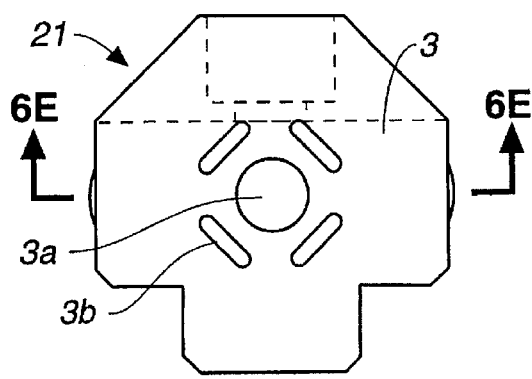
FIG._6B
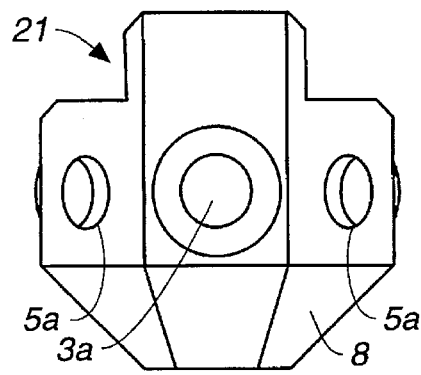
FIG._6C

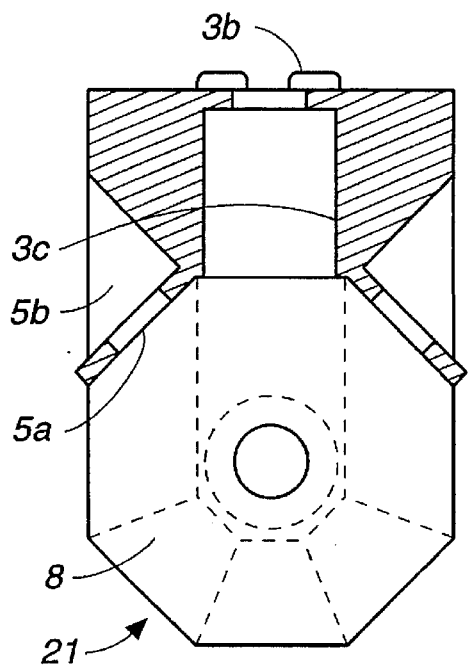
FIG._6E
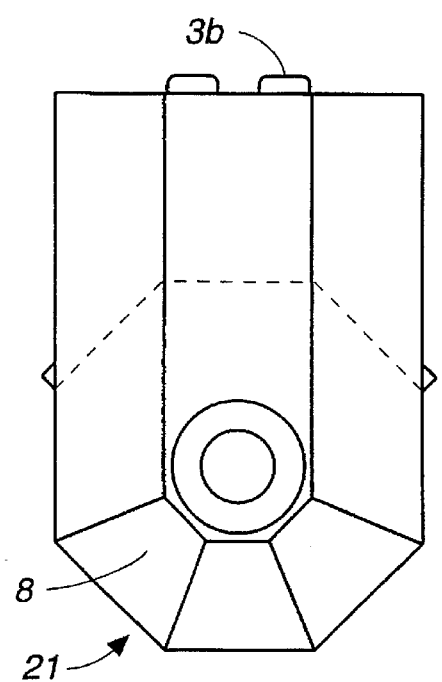
FIG._6G
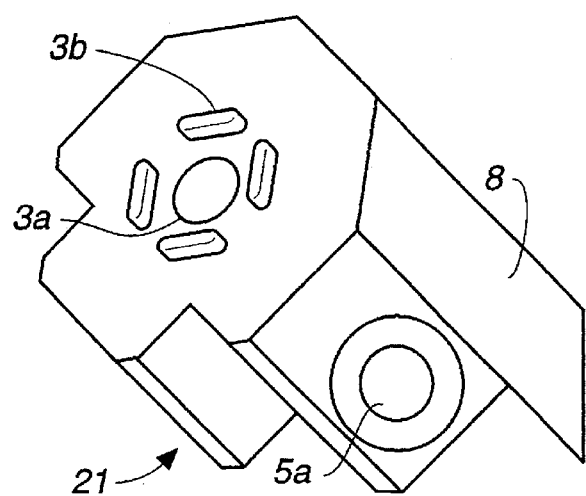
FIG._6F

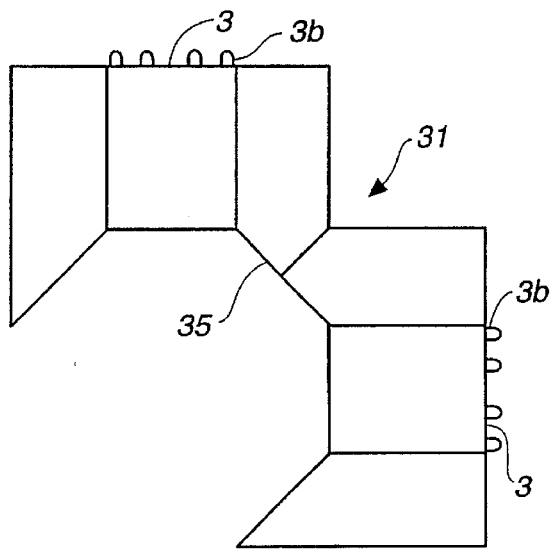
FIG._7A
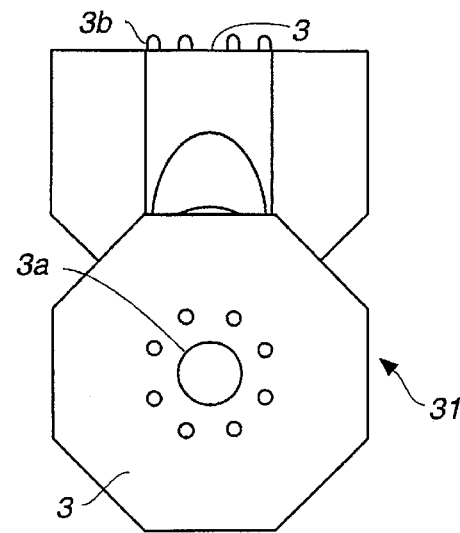
FIG._7D
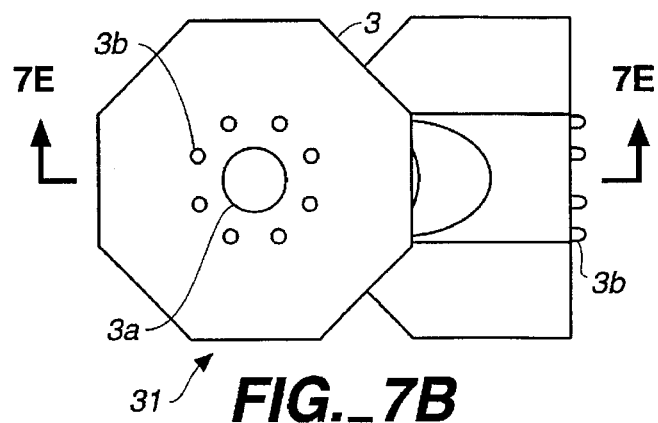
FIG._7B
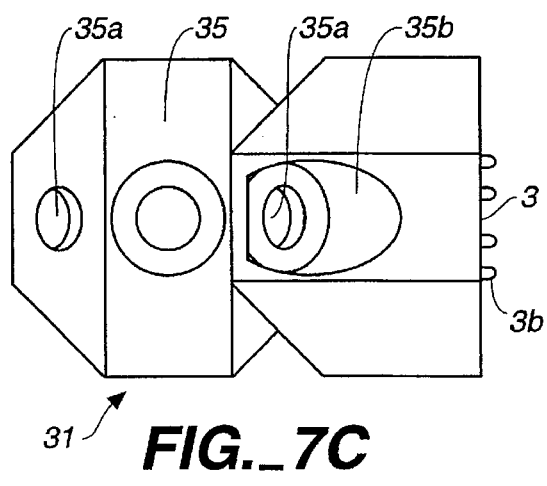
FIG._7C

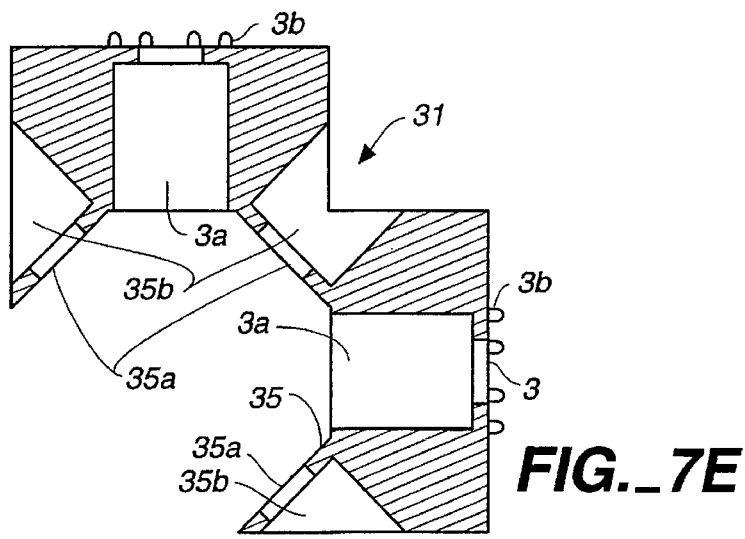
FIG._7E
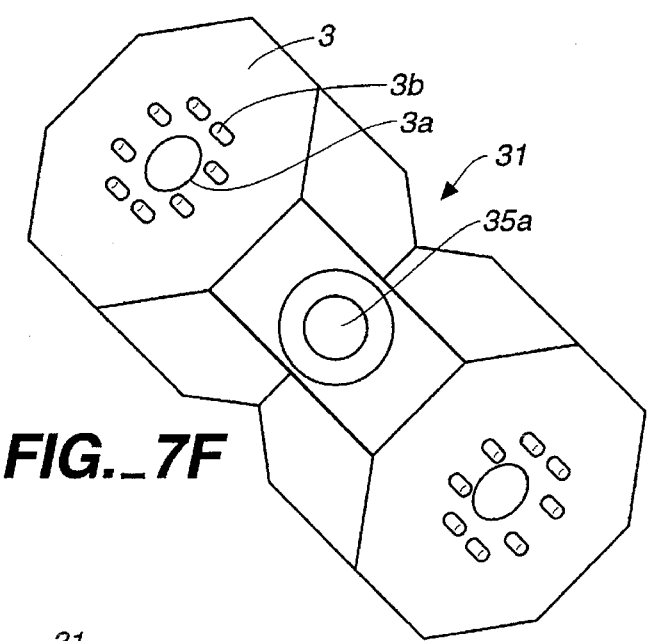
FIG._7F
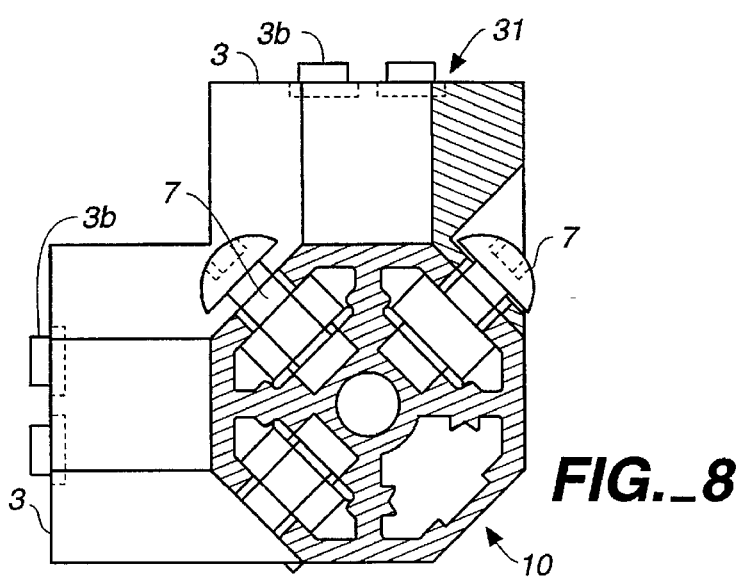
FIG._8

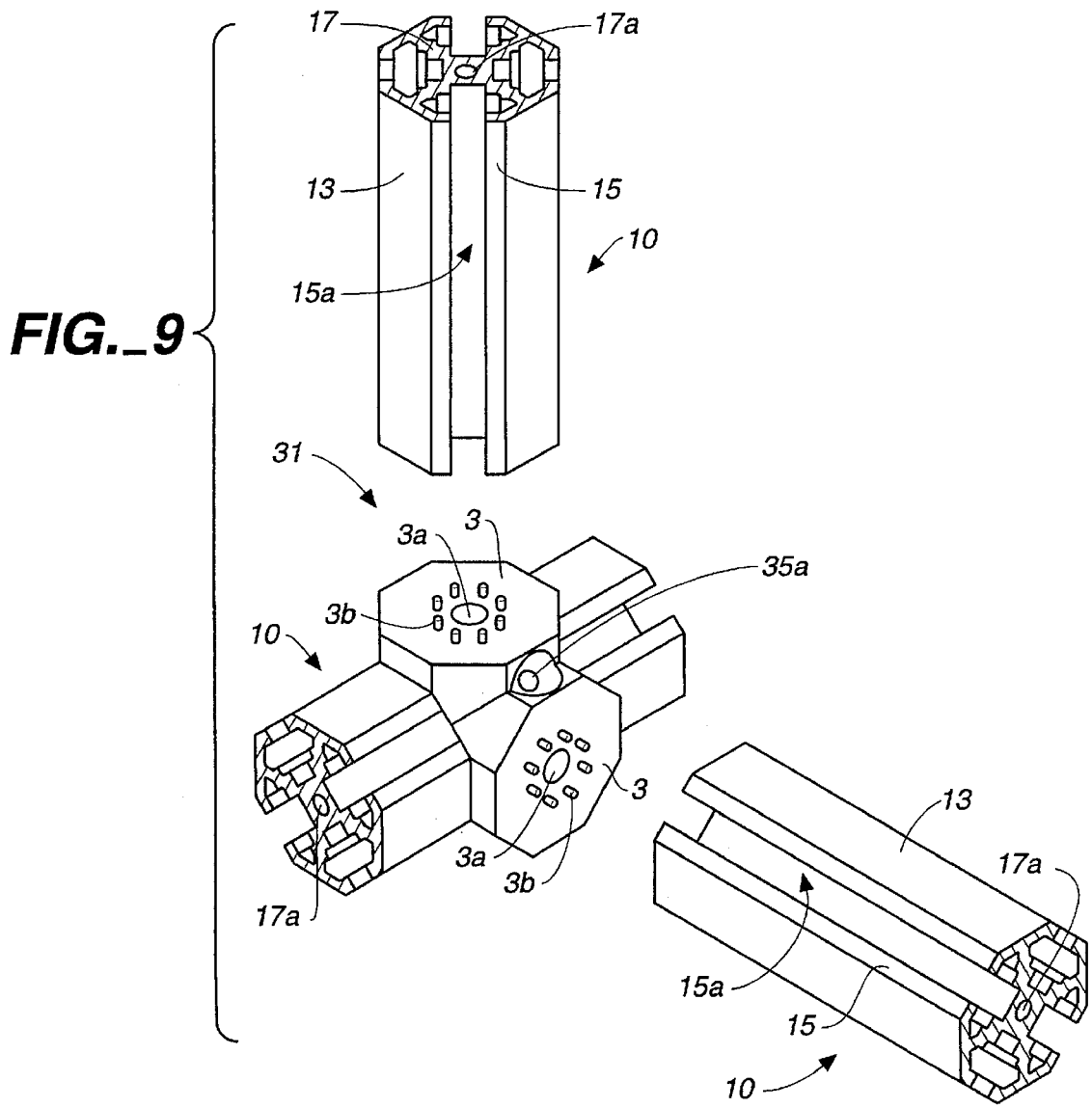

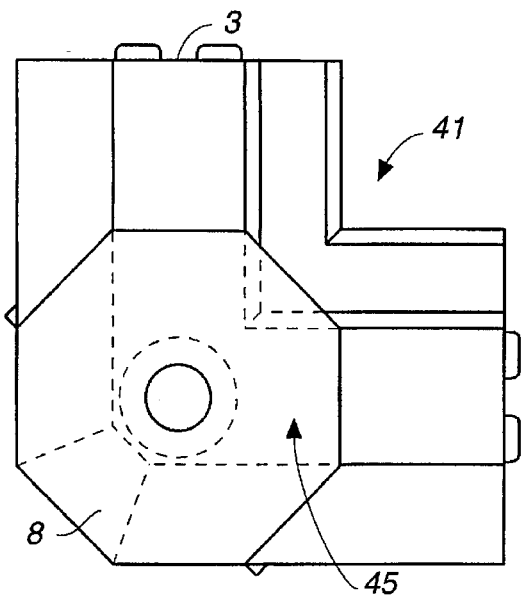
FIG._10A
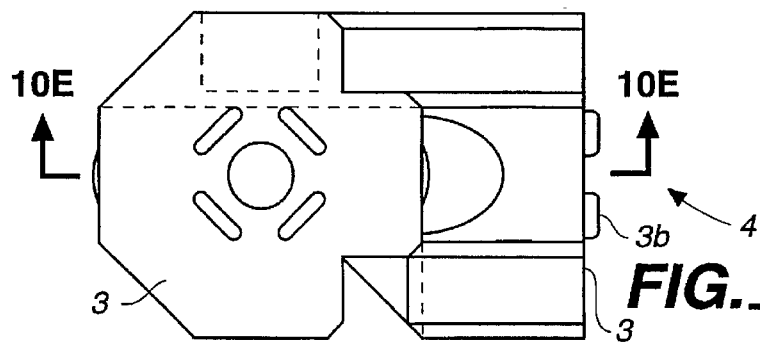
FIG._10B
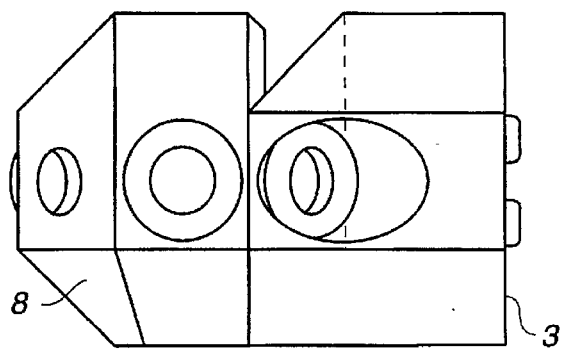
FIG._10C
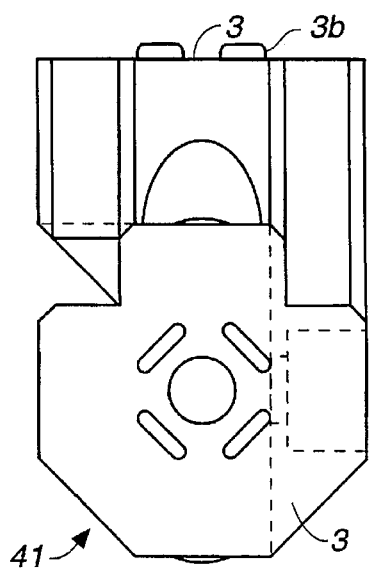
FIG._10D

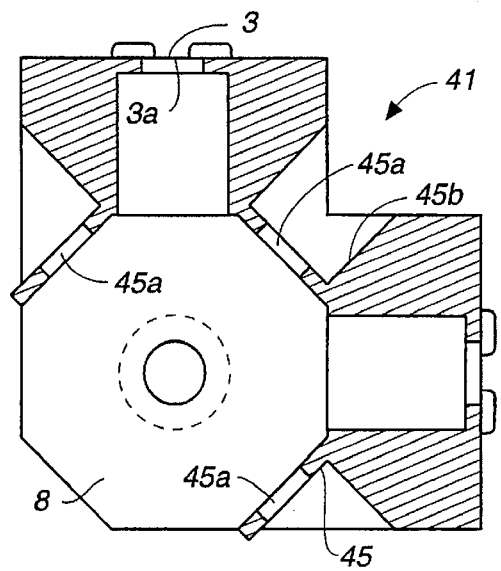
FIG._10E
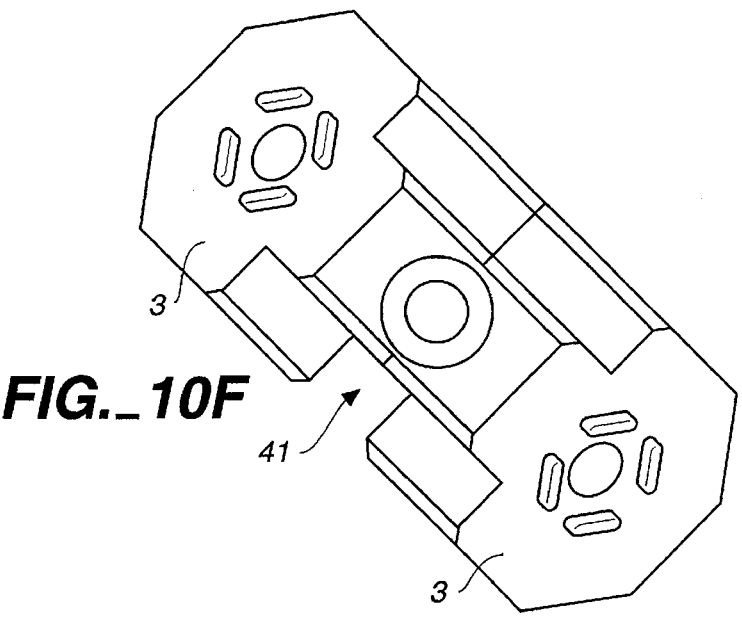
FIG._10F
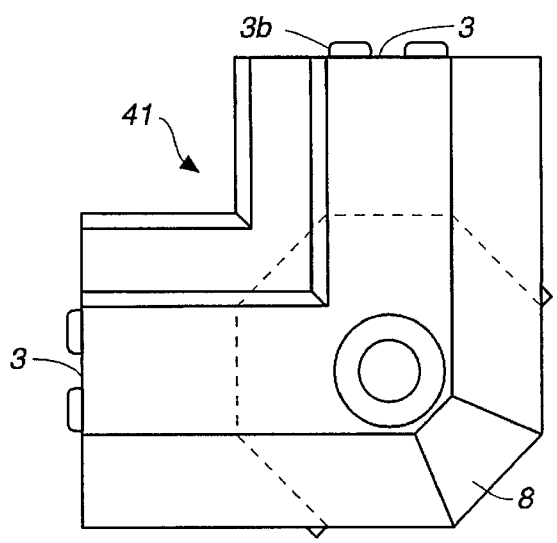
FIG._10G

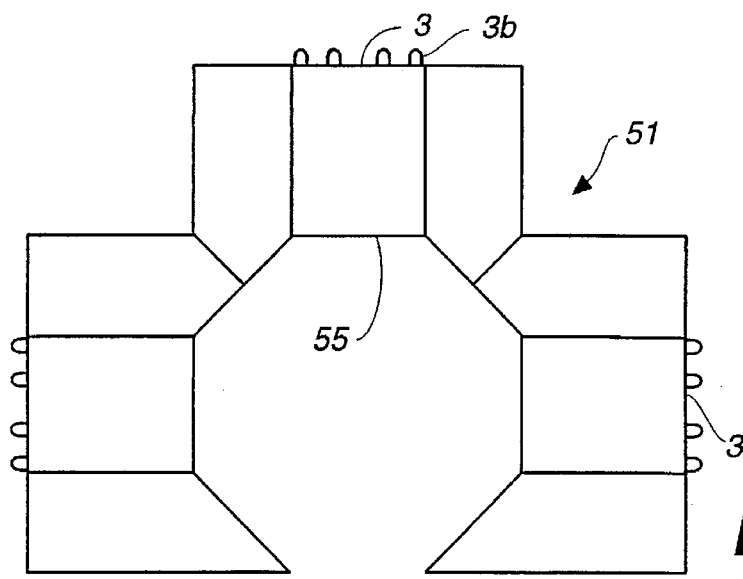
FIG._11A
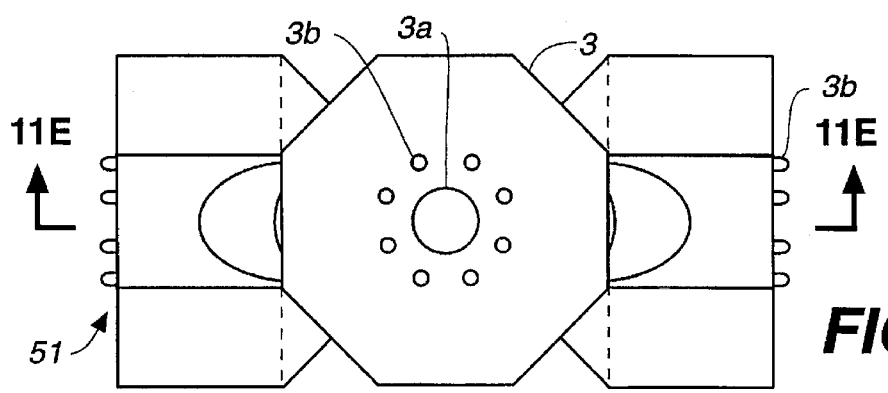
FIG._11B
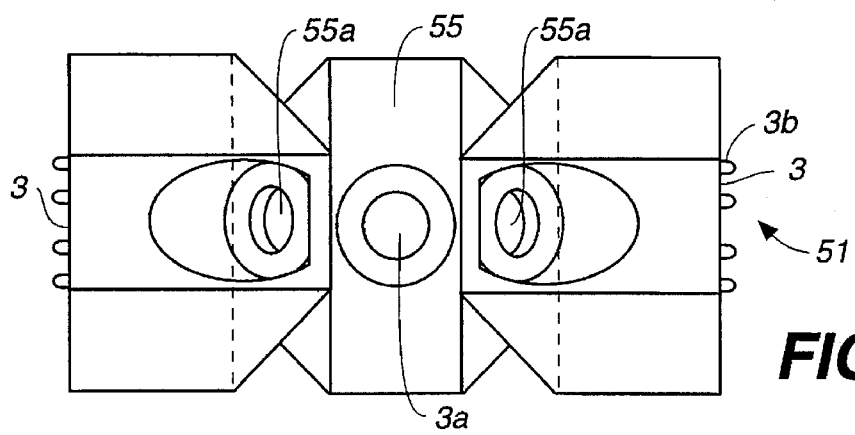
FIG._11C

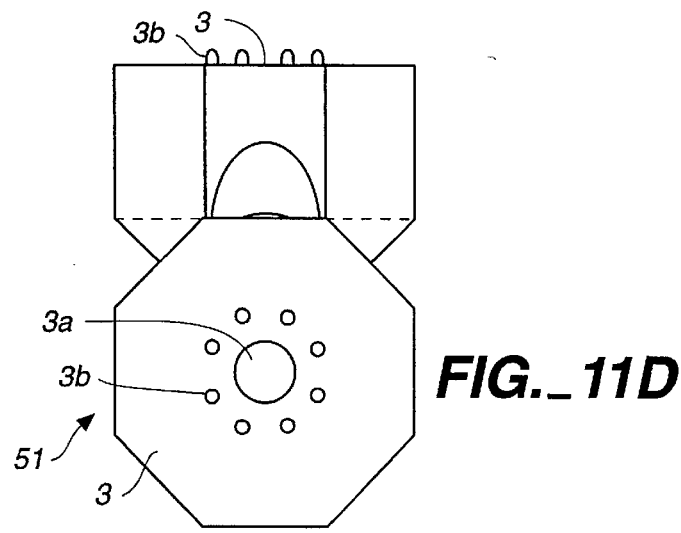
FIG._11D
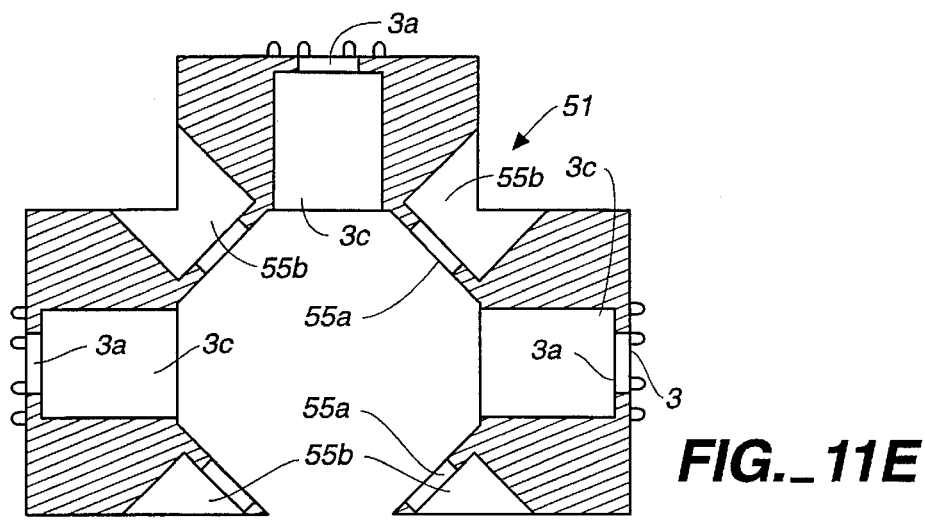
FIG._11E
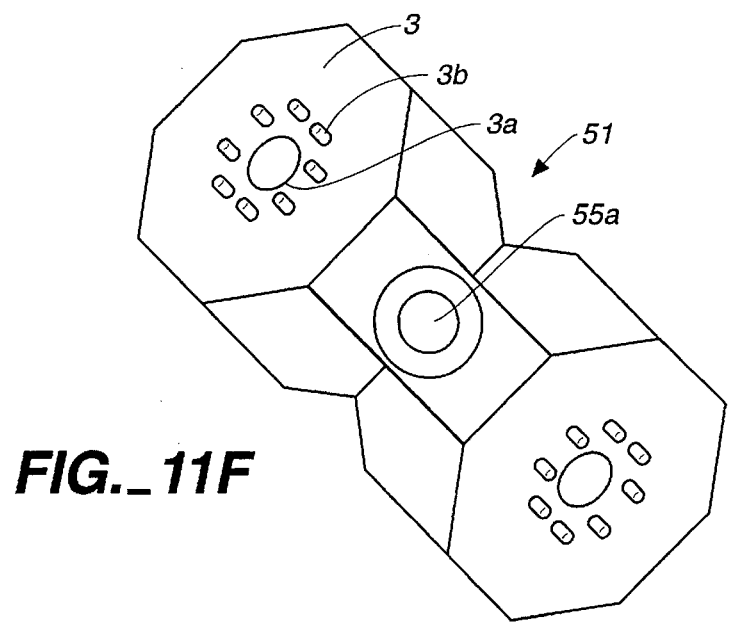
FIG._11F

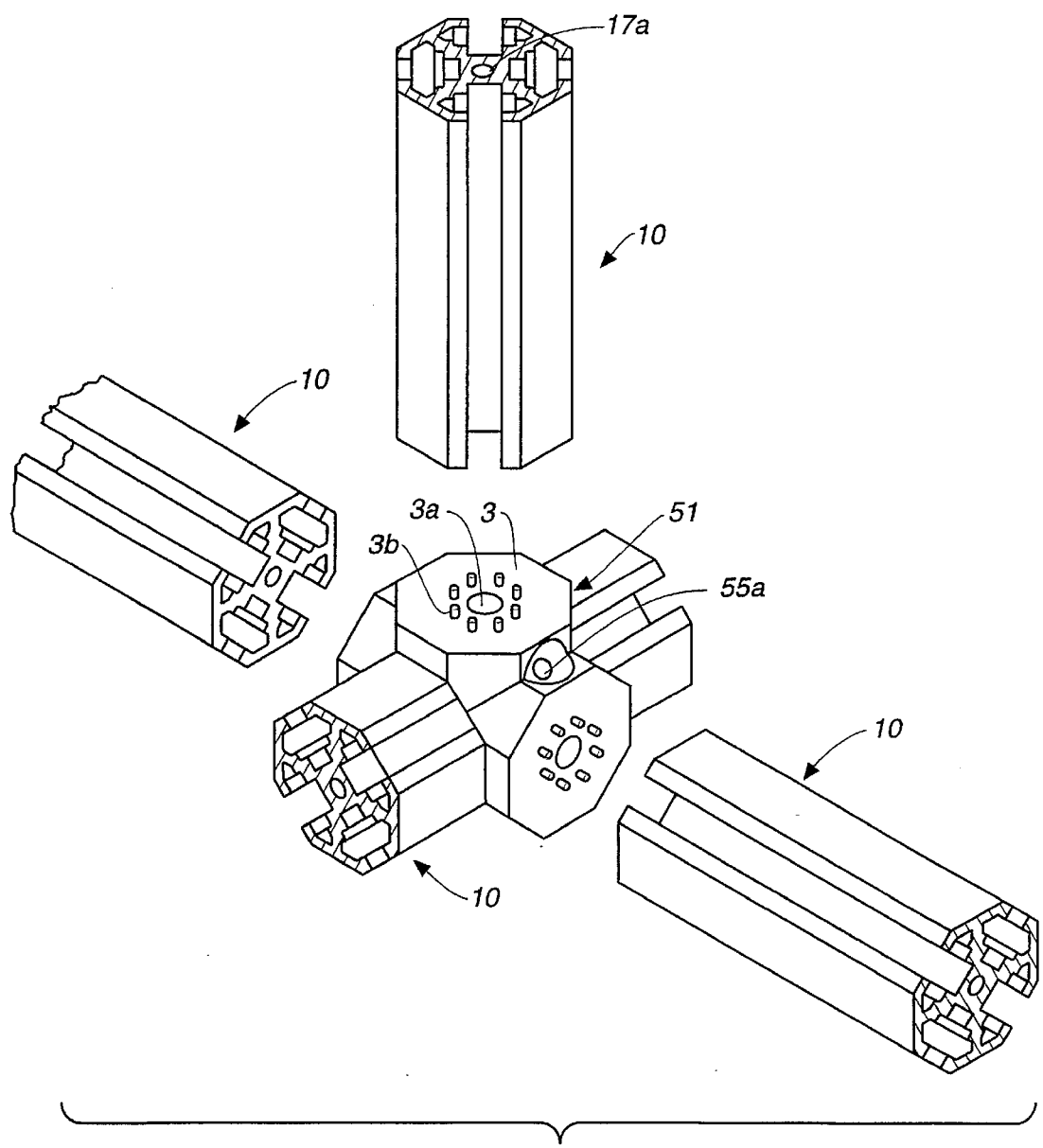
FIG._12

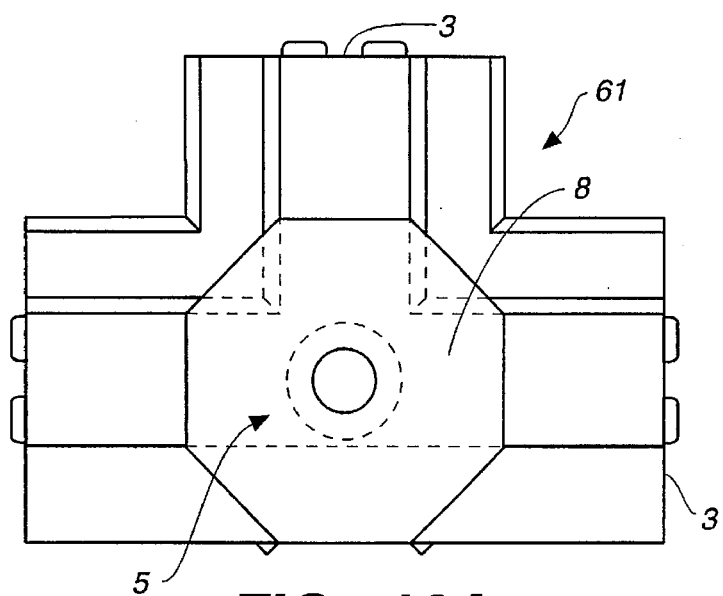
FIG._13A
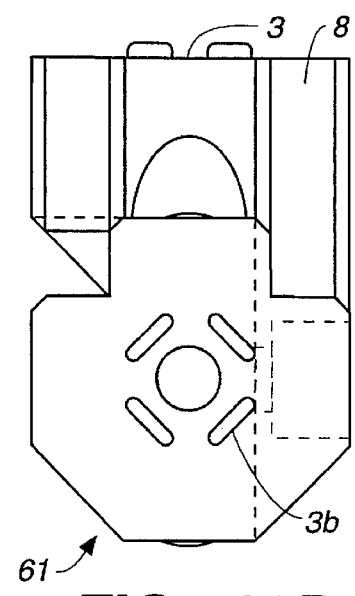
FIG._13D
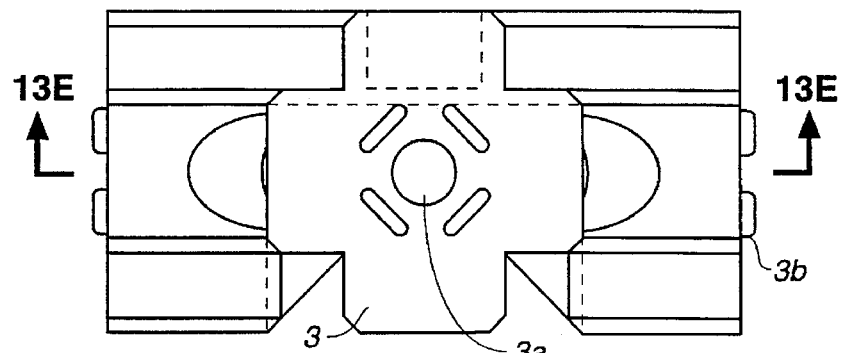
FIG._13B
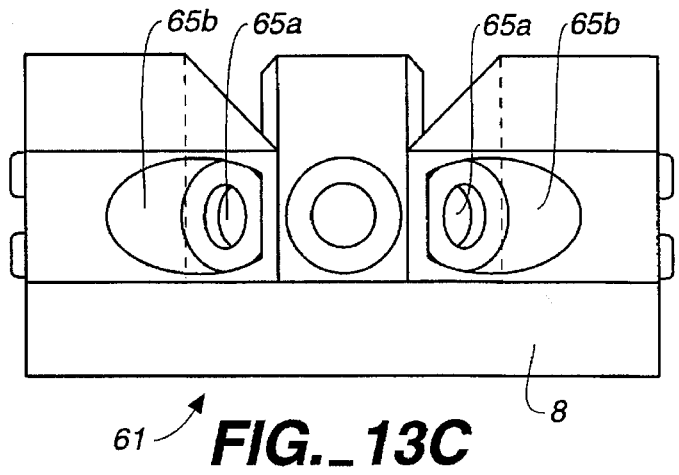
FIG._13C

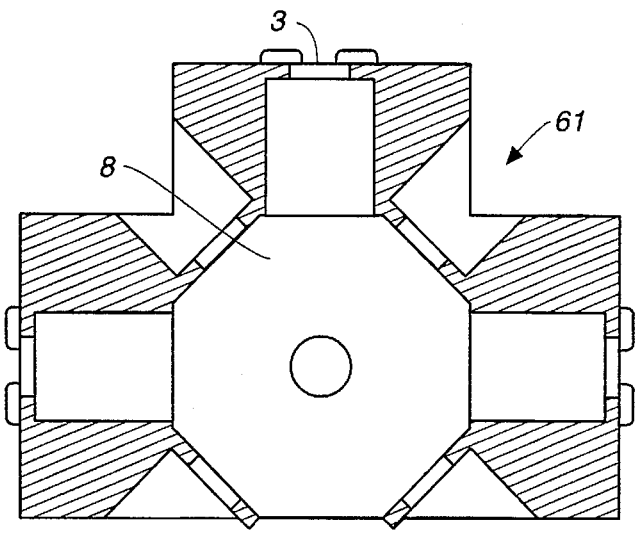
FIG._13E
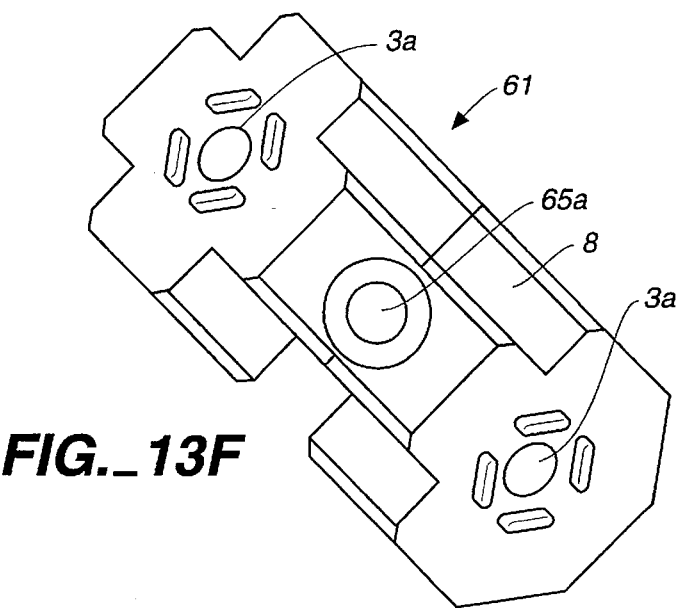
FIG._13F
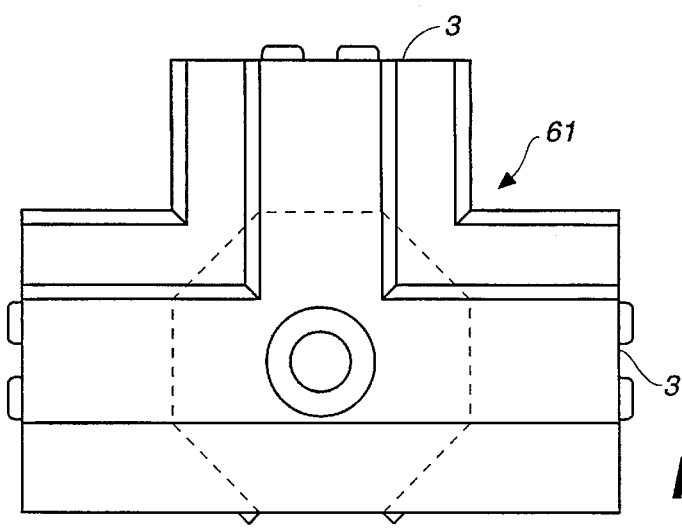
FIG._13G

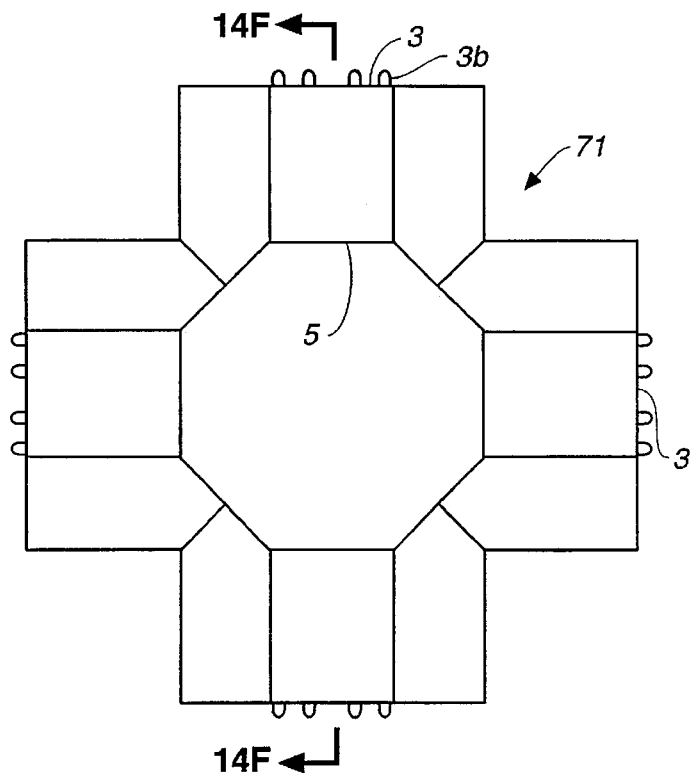
FIG._14A
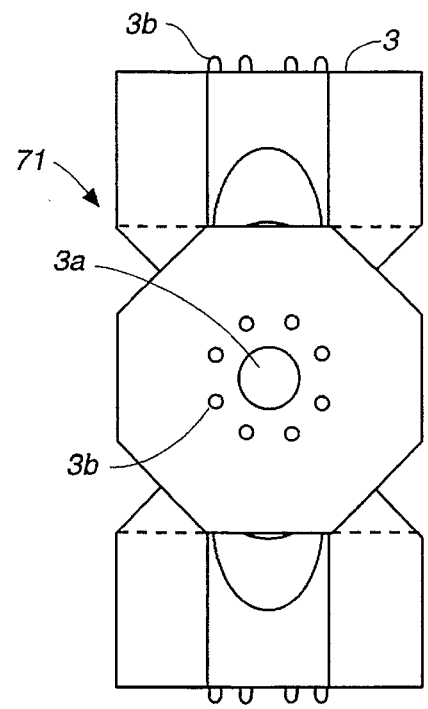
FIG._14C
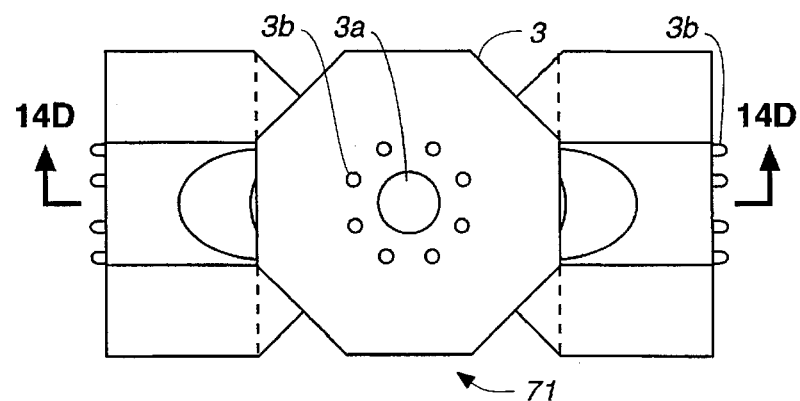
FIG._14B

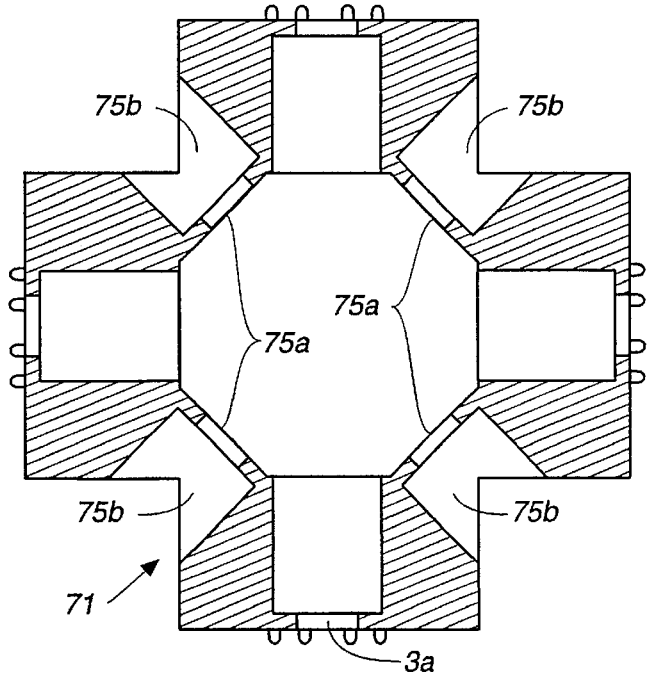
FIG._14D
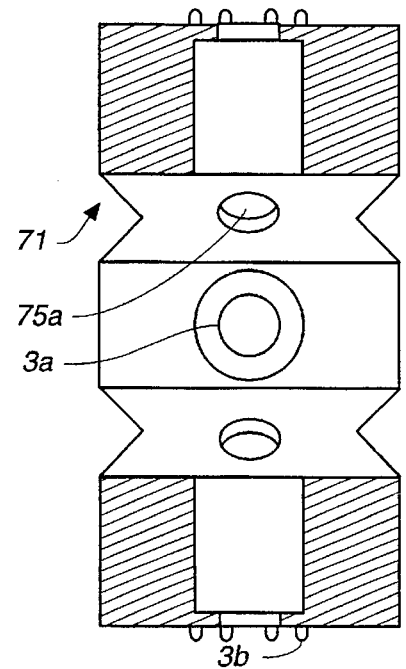
FIG._14F
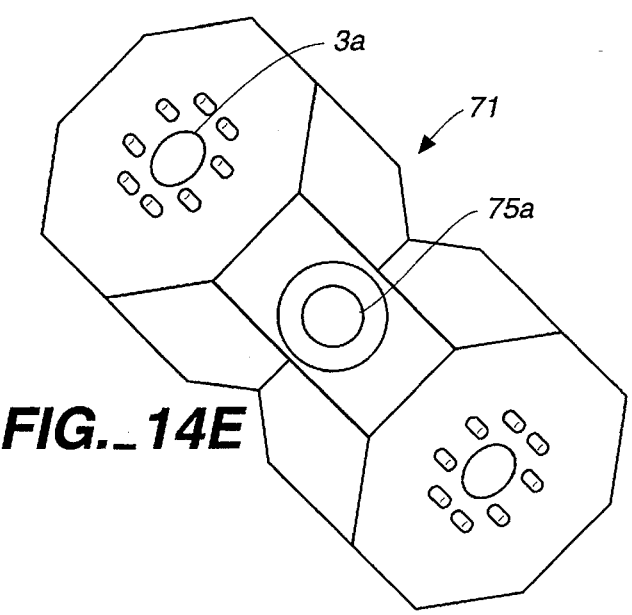
FIG._14E

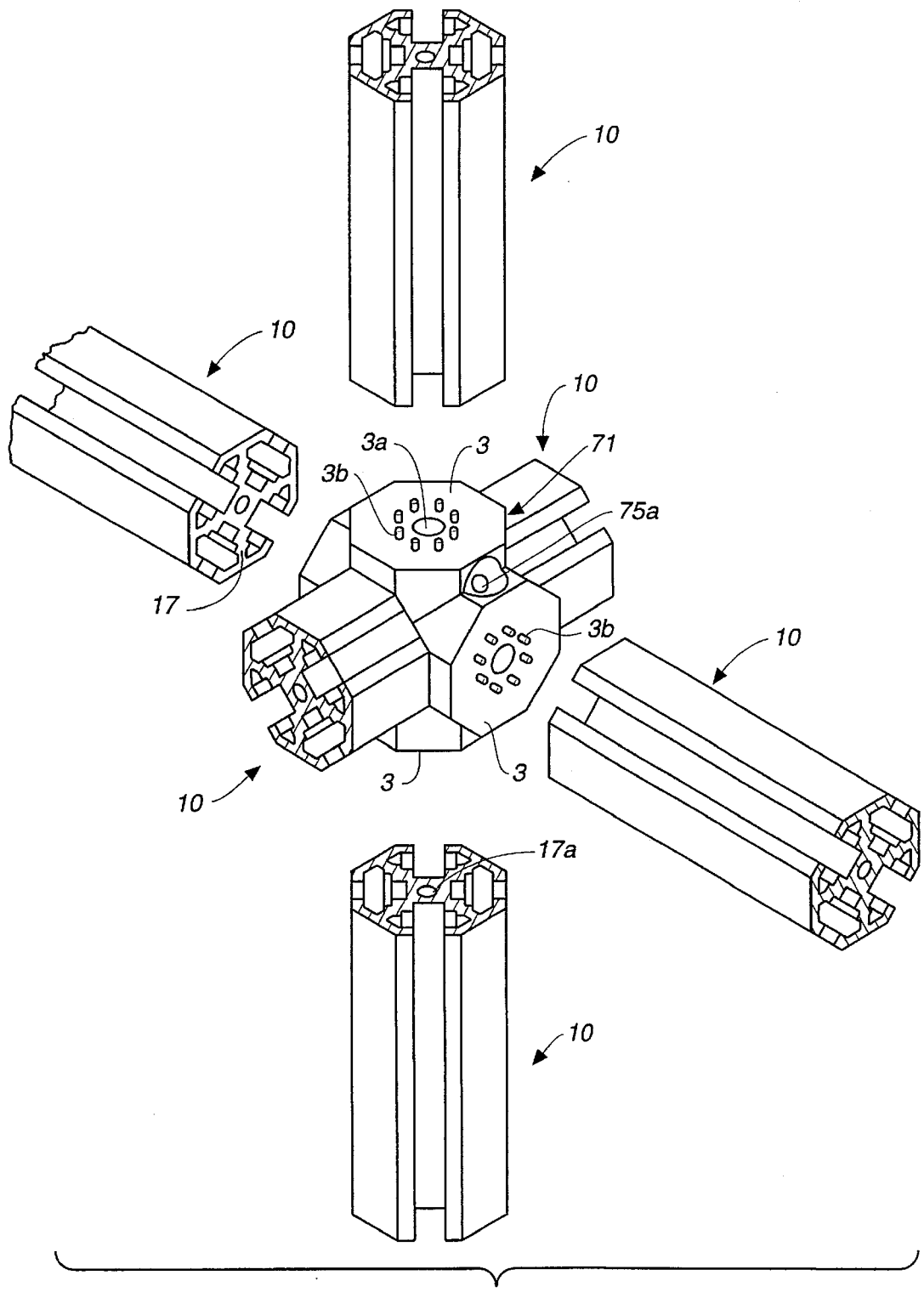
FIG._15

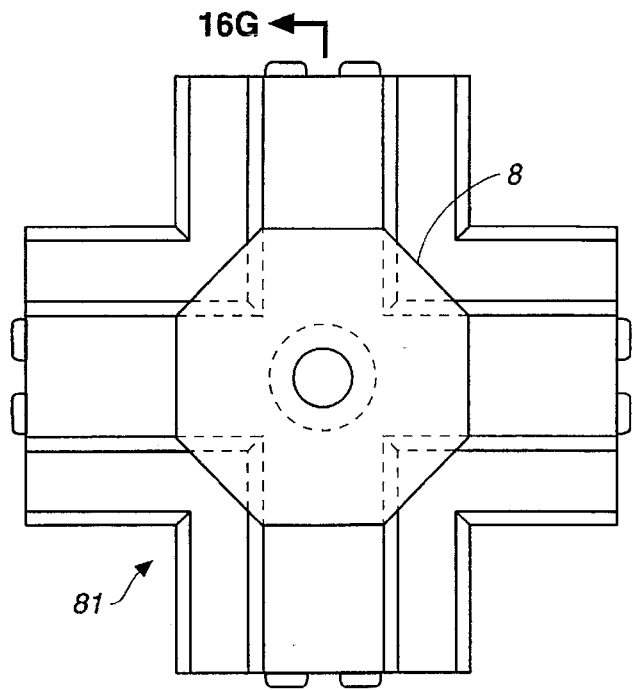
FIG._16A
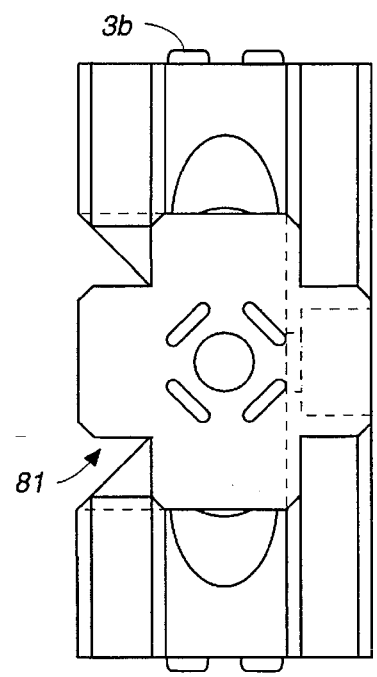
FIG._16C
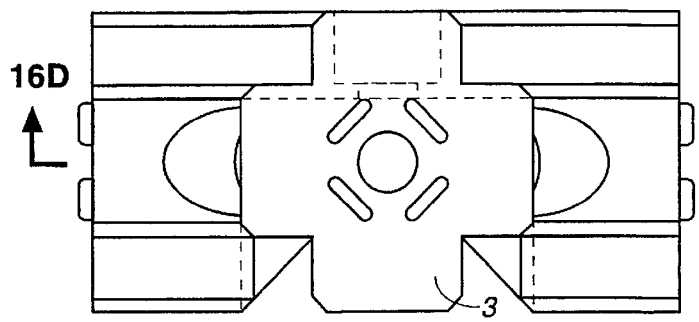
FIG._16B
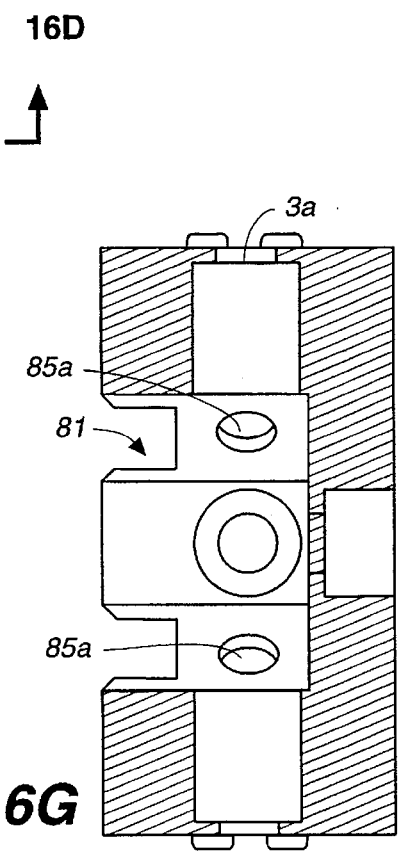
FIG._16G

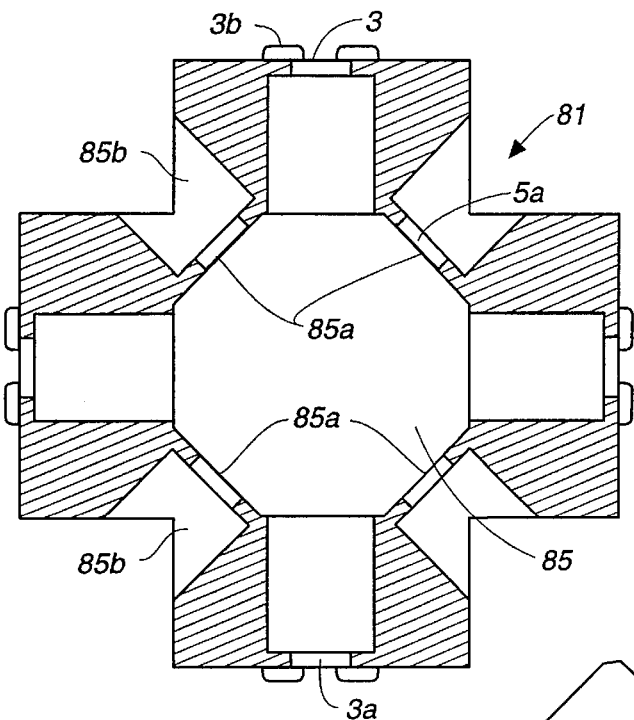
FIG._16D
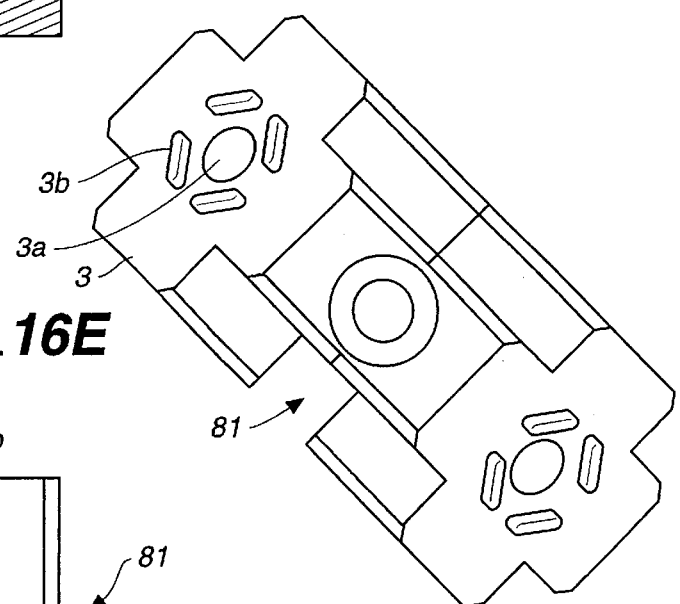
FIG._16E
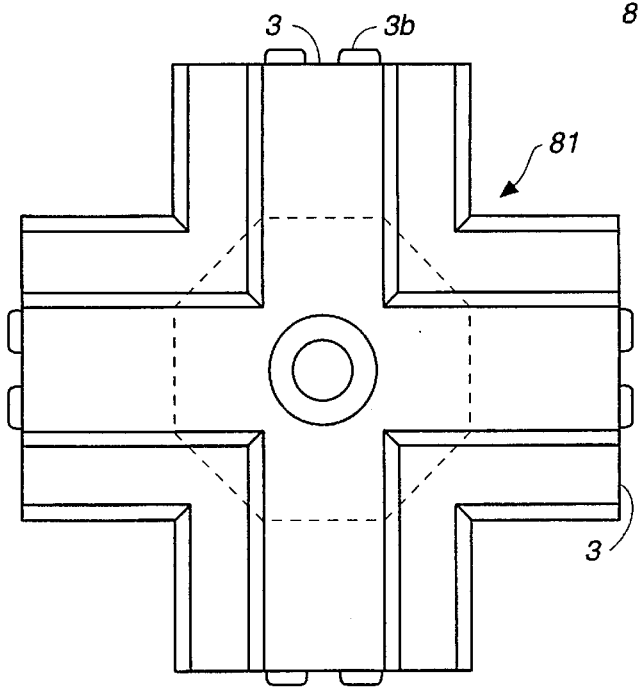
FIG._16F

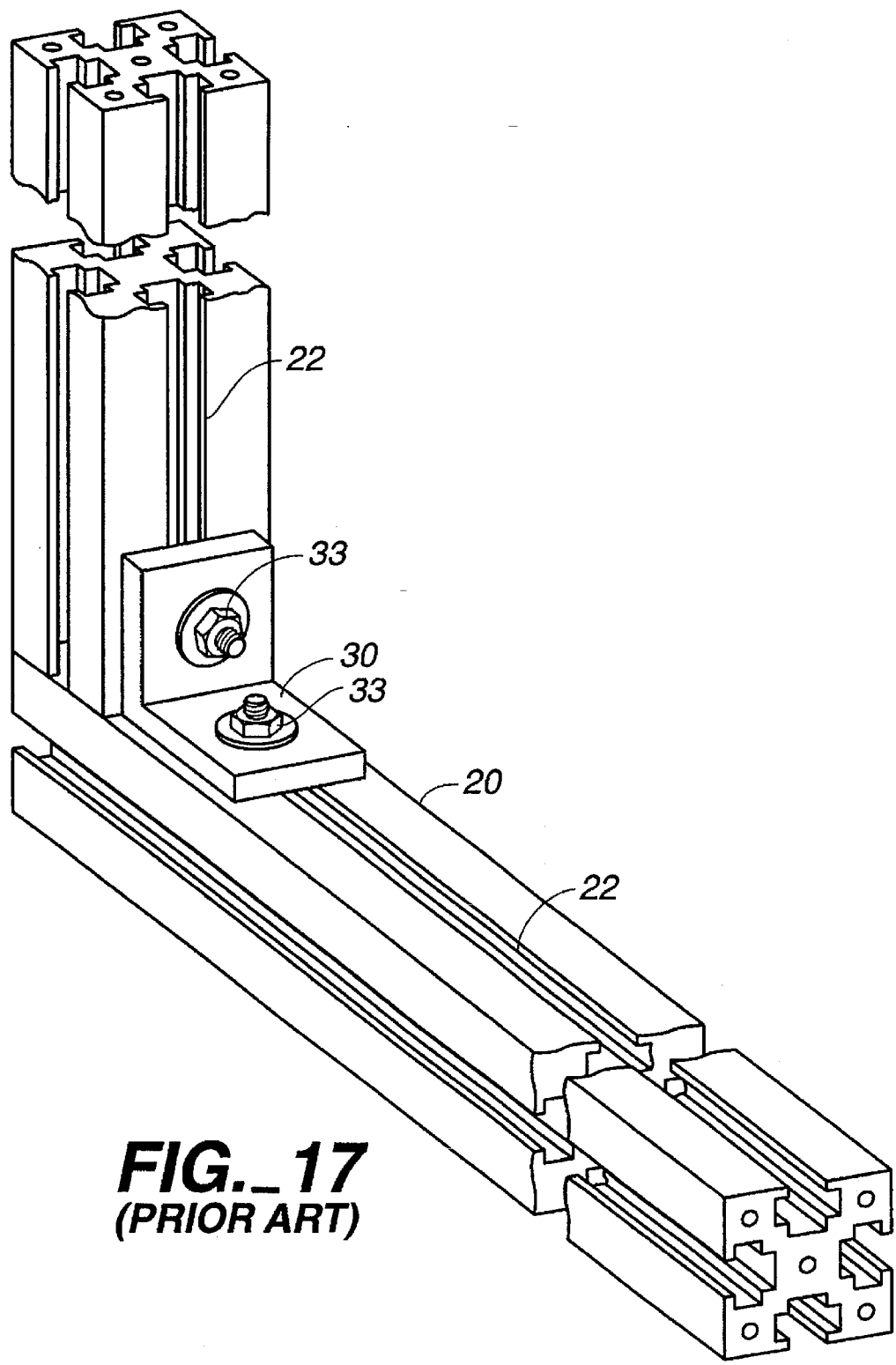
FIG._17
*(PRIOR ART)*

CONNECTING DEVICES FOR FRAME BARS WITH POLYGONAL CROSS-SECTIONAL SHAPE

BACKGROUND OF THE INVENTION

This invention relates to connecting devices for connecting together a plurality of elongated building materials such as frame bars.

For connecting together a plurality of elongated building materials such as frame bars, it has been known, as shown in FIG. 17, to set an L-shaped metal structure 30 on side surfaces of the bars 20 to be connected and to fasten it to them by using bolts 33 and nuts (not shown). Connections thus made are unsightly because the connecting structures 30 are openly visible. If the cross-sectional shape of the bars to be connected together is not quadrangular but polygonal with a larger number of sides, furthermore, the width of the side surfaces where the connecting structure can be fastened becomes smaller, and the strength of connection is adversely affected.

It is therefore an object of this invention to provide connecting devices capable of connecting together elongated building materials such as frame bars more securely.

It is another object of this invention to provide such connecting devices having less protrusions at the joint.

SUMMARY OF THE INVENTION

Connecting devices embodying this invention, with which the above and other objects can be accomplished, are characterized as being capable of securely connecting longitudinally elongated construction materials such as frame bars at a specified angle, comprising end-surface connecting parts each adapted to receive therein an end surface of one of the frame bars to be connected and a side-surface connecting part for receiving therein side surfaces of another frame bar to be connected. Each end-surface connecting part is facing outward, is provided with a bolt-receiving hole and is counter-bored from the opposite side such that a bolt can be passed therethrough with its head received in the counter-bored part and its tip protruding so as to be fastened to the end surface of one of the frame bars to be connected. The side-surface connecting part is on the opposite side of the end-surface connecting part and is adapted to connect to mutually adjacent side surfaces of one of the frame bars. Thus, it has an indentation in the cross-sectional shape of the frame bar to be accepted therein. The side-surface connecting part is provided not only with bolt-receiving holes but also corresponding counter-bored parts such that bolts can be passed therethrough perpendicularly to sloped side surfaces of the frame bar received thereby with their heads positioned inside the counter-bored parts and to securely attach the part to the frame bar with the bolts and nuts. One or more of such end-surface connecting parts are formed unitarily and at specified angles therebetween for providing secure connections. If the frame bar of which the side-surface connecting part is attached to side surfaces has an end surface at the joint, use may be made of a connecting device not only structured as above but also provided with a unitarily formed cover for covering up this end surface. This not only improves the appearance of the joint but make it safe because protrusions or other rough edges of the end surface of the frame bar can be properly shielded thereby.

BRIEF DESCRIPTION OF THE DRAWINGS

The accompanying drawings, which are incorporated in and form a part of this specification, illustrate embodiments of the invention and, together with the description, serve to explain the principles of the invention.

In the drawings:

FIGS. 1A, 1B, 1C, 1D, 1E, 1F and 1G (referred together as FIG. 1) are views of a connecting device according to a first embodiment of this invention as seen respectively from the front (FIG. 1A), from the top (FIG. 1B), from the bottom (FIG. 1C), from the left-hand side (FIG. 1D), from the right-hand side (FIG. 1E), sectionally from the front along the line 1E—1E of FIG. 1B (FIG. 1F), and diagonally sideways (FIG. 1G);

FIGS. 2A and 2B (referred to together as FIG. 2) are frontal and back diagonal views showing how the connecting device of FIG. 1 is used to connect two frame bars;

FIG. 3 is a diagonal view of two frame bars connected by the connecting device of FIG. 1;

FIG. 4 is a front view of an end cover for use with the connecting device of FIG. 1;

FIG. 5 is a sectional front view of the connection taken along line 5—5 of FIG. 3;

FIGS. 6A, 6B, 6C, 6D, 6E, 6F and 6G (referred to together as FIG. 6) are views of a connecting device according to a second embodiment of this invention as seen respectively from the front (FIG. 6A), from the top (FIG. 6B), from the bottom (FIG. 6C), from the left-hand side (FIG. 6D), sectionally from the front along the line 6E—6E of FIG. 6B (FIG. 6E), diagonally sideways (FIG. 6F) and from the back (FIG. 6G);

FIGS. 7A, 7B, 7C, 7D, 7E, and 7F (referred to together as FIG. 7) are views of a connecting device according to a third embodiment of this invention as seen respectively from the front (FIG. 7A), from the top (FIG. 7B), from the bottom (FIG. 7C), from the right-hand side (FIG. 7D), sectionally from the front along the line 7E—7E of FIG. 7B (FIG. 7E), and diagonally sideways (FIG. 7F);

FIG. 8 is a sectional back view of the connecting device of FIG. 7 as connecting three frame bars together;

FIG. 9 is a diagonal view showing how the connecting device of FIG. 7 is used to connect three frame bars;

FIGS. 10A, 10B, 10C, 10D, 10E, 10F and 10G (referred to together as FIG. 10) are views of a connecting device according to a fourth embodiment of this invention as seen respectively from the front (FIG. 10A), from the top (FIG. 10B), from the bottom (FIG. 10C), from the right-hand side (FIG. 10D), sectionally from the front along the line 10E—10E of FIG. 10B (FIG. 10E), diagonally sideways (FIG. 10F), and from the back (FIG. 10G);

FIGS. 11A, 11B, 11C, 11D, 11E and 11F (referred to together as FIG. 11) are views of a connecting device according to a fifth embodiment of this invention as seen respectively from the front (FIG. 11A), from the top (FIG. 11B), from the bottom (FIG. 11C), from the right-hand side (FIG. 11D), sectionally from the front along the line 11E—11E of FIG. 11B (FIG. 11E), and diagonally sideways (FIG. 11F);

FIG. 12 is a diagonal view of the connecting device of FIG. 11 connecting four frame bars together;

FIGS. 13A, 13B, 13C, 13D, 13E, 13F and 13G (referred to together as FIG. 13) are views of a connecting device according to a sixth embodiment of this invention as seen respectively from the front (FIG. 13A), from the top (FIG. 13B, from the bottom (FIG. 13C), from the right-hand side (FIG. 13D), sectionally from the front along the line 13E—13E of FIG. 13B (FIG. 13E), diagonally sideways (FIG. 13F), and from the back (FIG. 13 G);

FIG. 14A, 14B, 14C, 14D, 14E and 14F (referred to together as FIG. 14) are views of a connecting device according to a seventh embodiment of this invention as seen respectively from the front (FIG. 14A), from the top (FIG. 14B), from the right-hand side (FIG. 14C), sectionally from the front along the line 14D—14D of FIG. 14B (FIG. 14D), diagonally sideways (FIG. 14E), and sectionally from the right-hand side along the line 14F—14F of FIG. 14A (FIG. 14F);

FIG. 15 is a diagonal view of the connecting device of FIG. 14 connecting five frame bars together;

FIG. 16A, 16B, 16C, 16D, 16E, 16F and 16G (referred to together as FIG. 16) are views of a connecting device according to an eighth embodiment of this invention as seen respectively from the front (FIG. 16A), from the top (FIG. 16B), from the right-hand side (FIG. 16C), sectionally from the front along the line 16D—16D of FIG. 16B (FIG. 16D), diagonally sideways (FIG. 16E), from the back (FIG. 16F) and sectionally from the right-hand side along the line 16G—16G of FIG. 16A (FIG. 16G); and FIG. 17 is a diagonal view of a prior art connecting device connecting two frame bars.

DETAILED DESCRIPTION OF THE INVENTION

FIGS. 1, 2, 3, 4 and 5 show a connecting device 1 according to a first embodiment of the invention for connecting perpendicularly together two frame bars 10 with an octagonal cross-sectional external shape. As an example, the frame bars 10 to be connected will be assumed to be of the kind which alternately have planar side surfaces 13 and grooved side surfaces 15 each with a cross-sectionally T-shaped groove 15a formed longitudinally therein (such as Model AOG-3030-6 produced and sold by NIC Autotec Co., Ltd. of Toyama, Japan). Each T-shaped groove has a wide part 15b which can admit a nut (not shown) and an indented bottom part 15c for admitting the head of a bolt (not shown). A central column 17 with a square cross-sectional shape is formed, surrounded by the four T-shaped grooves 15a. A longitudinal central throughhole 17a is formed through this central column 17, serving as a tapping hole. Partition walls 18 are formed between mutually adjacent pairs of the grooves 15a, connecting the inner surfaces of the planar side surfaces 13 and edges of the square column 17 so as to provide the aforementioned wide parts 15b and indented bottom parts 15c.

The connecting device 1 according to the first embodiment of the invention is adapted to connect an end surface of one of such frame bars 10 to side surfaces of another such frame bar 10. For this purpose, the connecting device 1 according to this embodiment has an end-surface connecting part 3 facing outward to be connected to the end surface of a frame bar 10 as described above, being approximately octagonal as the cross-sectional shape of the frame bar 10 and provided with a central bolt-accepting throughhole 3a. A counter-bored part 3c is formed on the reverse side of the end-surface connecting part 3, as shown in FIG. 1F, such that, as a bolt 7 is passed through the throughhole 3a with its head inserted into the counter-bored part 3c, its end protrudes from the end-surface connecting part 3, as shown in FIG. 3, and this protruding tip of the bolt 7 is inserted into the central throughhole 17a of the frame bar 10 to be thereby tightly fastened thereto. Eight protrusions 3b are provided on the end-surface connecting part 3 perpendicularly thereto and symmetrically around the throughhole 3a at equal intervals.

On the reverse side of the end-surface connecting part 3, a side-surface connecting part 5 is formed for being attached to side surfaces of another frame bar 10 to be connected. Since the side surfaces of the frame bars 10 form an octagon cross-sectionally according to this embodiment of the invention, the side-surface connecting part 5 is not only itself in the form of an octagonal column but also has an indentation in the shape of a part of an octagonal column so as to accept therein three mutually adjacent side surfaces of the frame bar 10 transversely, as can be best seen in FIGS. 1A and 1F. In other words, the eight outer side surfaces of the side-surface connecting part 5 are cut such that four of them have a connecting edge parallel to the plane of the end-surface connecting part 3 and the other four are cut diagonally. Five mutually adjacent side surfaces of the transversely inserted frame bar 10 can thus tightly contact the edges of all eight side surfaces of the side-surface connecting part 5, as shown in FIGS. 3 and 5.

A bolt-accepting hole 5a is provided from the two longest side surfaces of the side-surface connecting part 5, extending perpendicularly to the adjacent sloped (with respect to the plane of the end-surface connecting part 3) side surface of the frame bar 10. A counter-bored part 5b is formed on the external end of the bolt-accepting hole 5a such that the head of a bolt inserted into the bolt-accepting hole 5a rests against the bottom of the counter-bored part 5b, as shown in FIG. 5.

The connecting device 1 thus designed is made of a light metal such as aluminum, and preferably of the same material as the frame bars 10 to be connected thereby. The connecting device 1 can be produced by a die-casting method by using a mold. It may be made of any of a variety of resin materials or a high-strength engineering plastic.

Next will be described a method of using the connecting device 1 according to the first embodiment of the invention to perpendicularly connect two frame bars 10 of the type described above with octagonal cross-sectional shape. First, an end surface of one of the frame bars 10 is attached to the end-surface connecting part 3 such that they match each other and the protrusions 3b surround the central column 17 of the frame bar 10 for proper positioning. After this is done, a bolt 7 is inserted through the bolt-accepting throughhole 3a from the reverse side (that is, from the side of the side-surface connecting part 5) into the central throughhole 17a of the frame bar 10, or the tapping hole, thereby securing the connecting device 1 to the end surface of the first frame bar 10.

Next, another frame bar 10 is transversely positioned against the side-surface connecting part 5 of the connecting device 1 such that its side surfaces match as described above, the grooved side surfaces 15 of the frame bar 10 being sloped with respect to the end-surface connecting part 3, as shown in FIG. 2. If this is done, the bolt-accepting holes 5a of the side-surface connecting part 5 open into the grooves 15a of the two of the grooved side surfaces 15, and bolts 7 are inserted through the bolt-accepting holes 5a into the corresponding grooves 15a. Nuts 9 are positioned inside the grooves 15a, and the bolts 7 are engaged with and tightened with the nuts 9, as shown in FIG. 5, to fasten the side-surface connecting part 5 to the side surfaces of the frame bar 10, as shown in FIG. 3. If desired, the exposed end surfaces of the transversely connected frame bar 10 may be covered with end covers 6, as shown in FIG. 4. The end cover 6 may preferably comprise protrusions 6a for engagingly surrounding the central column 17 of the frame bar 10 to which it is attached.

With a connecting device 1 thus structured, two cross-sectionally octagonal frame bars with T-shaped grooves can be connected perpendicularly with improved strength.

FIG. 6 shows another connecting device 21 according to a second embodiment of the invention which is similar to the first embodiment described above but unitarily incorporates an end cover 8 for covering the end surface of the transversely connected frame bar 10 fastened to the side-surface connecting part 5. In other words, the connecting device 21 according to the second embodiment is for use when an L-shaped connection is made of two frame bars 10, while the connecting device 1 according to the first embodiment is for making a T-shaped connection. In other respects, the two embodiments are alike and hence those components which are substantially identical to those described above with reference to FIGS. 1, 2, and 3 are indicated in FIG. 6 also by the same numerals. As shown in FIG. 6, the end cover 8 is unitarily formed with the connecting device 1 and has the same shape as the end surface of the frame bar 10. A connecting device 1 thus formed is advantageous for presenting a sightly joint.

FIGS. 7, 8 and 9 show still another connecting device 31 according to a third embodiment of this invention for connecting mutually perpendicularly three frame bars 10 of the kind described above or, more precisely, how end surfaces of two such frame bars are mutually perpendicularly attached transversely to a third one. For convenience of explanation, the components which are similar to those explained above with reference to another connecting device are indicated by the same numerals. As can be understood by comparing FIGS. 1 and 7, the connecting device 31 according to the third embodiment is formed by perpendicularly connecting two of the connecting devices 1 according to the first embodiment. Thus, it has two end-surface connecting parts 3 and one side-surface connecting part 35, the latter being designed to contact five of the eight side surfaces of one of the three frame bars (not shown in FIG. 7), as can best be seen in FIG. 7A. For the purpose of attachment, the side-surface connecting part 35 is provided with three bolt-accepting holes 35a and three corresponding counter-bored parts 35b. Three of the grooved side surfaces 15 of the frame bar 10 are aligned with these bolt-accepting holes 35a, and bolts 7 and nuts 9 are used to fasten them together, as shown in FIG. 8 (wherein only one bolt and one nut are shown). Each of the end-surface connecting parts 3 is structured and used as explained above for the connecting device 1 according to the first embodiment of the invention.

FIG. 10 shows still another connecting device 41 according to a fourth embodiment of this invention, which is similar to the connecting device 31 according to the third embodiment except that a cover 8 for covering the end surface of the transversely connected frame bar inserted through the side-surface connecting part 45 is incorporated unitarily therewith. As explained with reference to the connecting device 21 according to the second embodiment of the invention shown in FIG. 6, the cover 8 is formed in the same shape as the cross-section of the frame bar 10. In other aspects, the connecting devices 31 and 41 according to the third and fourth embodiments of the invention are identical, and the corresponding components therebetween are indicated by the same numerals in FIGS. 7–9 and 10, except that bolt-accepting holes and counter-bored parts of the side-surface connecting part 45 are respectively indicated by 45a and 45b.

FIGS. 11 and 12 show still another connection device 51 according to a fifth embodiment of this invention, adapted to connect together four of the frame bars 10 of the kind described above, or three of them with their end surfaces attached transversely to the fourth one from three sides. As can be understood by comparing FIGS. 1 and 11, the connecting device 51 according to the fifth embodiment is formed by perpendicularly connecting three of the connecting devices 1 according to the first embodiment. Thus, it has three end-surface connecting parts 3 and one side-surface connecting part 55, the latter being designed to contact seven of the eight side surfaces of the transversely connected one of the frame bars (not shown in FIG. 11), as can best be seen in FIG. 11A. For the purpose of attachment, the side-surface connecting part 55 is provided with four bolt-accepting holes 55a and four corresponding counter-bored parts 55b. All four grooved side surfaces 15 of the frame bar 10 are aligned with these bolt-accepting holes 55a, and bolts and nuts are used to fasten them together, as shown in FIG. 12. Each of the end-surface connecting parts 3 is structured and used as explained above for the connecting device 1 according to the first embodiment of the invention. Thus, all other components which are substantially identical to those shown in FIG. 1 are indicated by the same symbols.

FIG. 13 shows still another connecting device 61 according to a sixth embodiment of this invention, which is similar to the connecting device 51 according to the fifth embodiment except that a cover 8 for covering the end surface of the transversely connected frame bar inserted through the side-surface connecting part 65 is incorporated unitarily therewith. As explained with reference to the connecting device 21 according to the second embodiment of the invention shown in FIG. 6, the cover 8 is formed in the same shape as the cross-section of the frame bar 10. In other aspects, the connecting devices 51 and 61 according to the fifth and sixth embodiments of the invention are identical, and the corresponding components therebetween are indicated by the same numerals in FIGS. 11 and 12 and FIG. 13, except that bolt-accepting holes and counter-bored parts of the side-surface connecting part 65 are respectively indicated by 65a and 65b.

FIGS. 14 and 15 show still another connecting device 71 according to a seventh embodiment of this invention, adapted to connect together five of the frame bars 10 of the kind described above, or four of them with their end surfaces attached transversely to the fifth one sideways from four sides. As can be understood by comparing FIGS. 1 and 14, the connecting device 71 according to the seventh embodiment is formed by perpendicularly connecting four of the connecting devices 1 according to the first embodiment. Thus, it has four end-surface connecting parts 3 and one side-surface connecting part 55, the latter being designed to contact all eight side surfaces of the transversely connected frame bar (not shown in FIG. 14), as can best be seen in FIGS. 14A and 14D. For the purpose of attachment, the side-surface connecting part 75 is provided with four bolt-accepting holes 75a and four corresponding counter-bored parts 75b. All four grooved side surfaces 15 of the frame bar 10 are aligned with these bolt-accepting holes 75a, and bolts and nuts are used to fasten them together, as shown in FIG. 15. Each of the end-surface connecting parts 3 is structured and used as explained above for the connecting device 1 according to the first embodiment of the invention. Thus, all other components which are substantially identical to those shown in FIG. 1 are indicated by the same symbols.

FIG. 16 shows still another connecting device 81 according to an eighth embodiment of this invention, which is similar to the connecting device 71 according to the seventh embodiment except that a cover 8 for covering the end surface of the transversely connected frame bar inserted through the side-surface connecting part 85 is incorporated unitarily therewith. As explained with reference to the connecting device 21 according to the second embodiment of the invention shown in FIG. 6, the cover 8 is formed in the same shape as the cross-section of the frame bar 10. In other aspects, the connecting devices 71 and 81 according to the seventh and eighth embodiments of the invention are identical, and the corresponding components therebetween are indicated by the same numerals in FIGS. 14 and 15 and FIG. 16, except that bolt-accepting holes and counter-bored parts of the side-surface connecting part 85 are respectively indicated by 85a and 85b.

This invention has been described above with reference to only a limited number of examples but these examples are not intended to limit the scope of the invention. Many modifications and variations are possible within the scope of this invention. For example, although descriptions have been made only of devices for perpendicularly connecting frame bars having an octagonal cross-sectional shape, the present invention can be applied to connecting devices for connecting frame bars with other polygonal-cross sectional shapes and/or at angles other than right angles with respect to one another. In summary, this invention provides devices for connecting frame bars of many different cross-sectional shapes at different angles not only strongly but also such that the joint will have a sightly appearance without protrusions and hence will be safer.

What is claimed is:

1. A device for connecting together elongated construction members each having an axially extending central throughhole and an end surface perpendicular thereto, said device comprising:

one or more end-surface connecting parts each having an attachment surface adapted to be attached in a face-to-face relationship to the end surface of a corresponding one of said elongated construction members; and a side-surface connecting part adapted to receive therein and to be attached to side surfaces of another one of said elongated construction members;

said end-surface connecting part each having a bolt-accepting hole formed in said attachment surface for allowing a bolt to pass therethrough and into said central throughhole and a counter-bored part for receiving therein the head of said bolt, said side-surface connecting part being formed on each of said end-surface connecting parts and comprising connecting surfaces which are formed according to the shape of, and are adapted to contact, side surfaces of said another elongated construction member and affixing means penetrating said connecting surfaces for affixing said side-surface connecting part to said side surfaces of said another elongated construction member.

2. The device of claim 1 wherein said affixing means include side-connecting bolts adapted to pass through throughhole formed through said side-surface connecting part and nuts which are adapted to engage with said side-connecting bolts.

3. The device of claim 1 wherein said elongated construction members have eight side surfaces and said side-surface connecting part is shaped so as to engagingly accept mutually adjacent three of said eight side surfaces of said another construction member.

4. The device of claim 2 wherein said elongated construction members have eight side surfaces and said side-surface connecting part is shaped so as to engagingly accept mutually adjacent three of said eight side surfaces of said another construction member.

5. The device of claim 1 having a plurality of said end-surface connecting parts formed unitarily at specified angles therebetween, each of said end-surface connecting parts being connected to one of said elongated construction members which extends perpendicularly to said another one of said elongated construction members.

6. The device of claim 2 having a plurality of said end-surface connecting parts formed unitarily at specified angles therebetween, each of said end-surface connecting parts being connected to one of said elongated construction members which extends perpendicularly to said another one of said elongated construction members.

\* \* \* \* \*